United States Patent [19]
Huber

[11] Patent Number: 5,520,274
[45] Date of Patent: May 28, 1996

[54] FRICTION CLUTCH

[75] Inventor: Lothar Huber, Bühl-Altschweier, Germany

[73] Assignee: Luk Lamellen und Kupplungsbau GmbH, Bühl, Germany

[21] Appl. No.: 264,557

[22] Filed: Jun. 23, 1994

[30]  Foreign Application Priority Data

Jun. 23, 1993 [DE] Germany .......................... 43 20 847.9
Feb. 4, 1994 [DE] Germany .......................... 44 03 423.7

[51] Int. Cl.$^6$ ................................................. F16D 13/71
[52] U.S. Cl. ........................................ 92/89.23; 192/70.27
[58] Field of Search ............................ 192/70.27, 89.22, 192/89.23

[56]  References Cited

U.S. PATENT DOCUMENTS

| | | | |
|---|---|---|---|
| 3,595,355 | 7/1971 | Maucher et al. | 192/70.27 |
| 3,811,544 | 5/1974 | Maucher | 192/70.27 X |
| 3,939,951 | 2/1976 | Sink et al. | 192/89.23 |
| 4,211,315 | 7/1980 | Fenart | 192/70.27 |
| 4,619,354 | 10/1986 | Rostin et al. | 192/89.23 |
| 4,667,795 | 5/1987 | Ooga et al. | 192/70.27 |
| 4,989,710 | 2/1991 | Reik et al. | |

FOREIGN PATENT DOCUMENTS

| | | |
|---|---|---|
| 3440827A1 | 6/1985 | Germany . |
| 3420109A1 | 7/1985 | Germany . |
| 2102899 | 2/1983 | United Kingdom . |
| 2189558 | 10/1987 | United Kingdom ................ 192/89.23 |

*Primary Examiner*—Richard M. Lorence
*Attorney, Agent, or Firm*—Darby & Darby

[57]  ABSTRACT

A friction clutch wherein an intermediate portion of a diaphragm spring is tiltable between two seats which are held in requisite positions by arms bent out from the bottom wall of the clutch housing. The arms extend axially within the seats and through openings provided therefor in the diaphragm spring, thereupon radially outwardly to overlie that side of the seat which confronts the pressure plate of the clutch to thus prevent axial movements of the seats and an intermediate portion of the spring relative to the bottom wall, and finally axially toward the bottom wall to prevent radial expansion of the seat confronting the pressure plate. The seats are or include split wire rings. The seat which is adjacent the bottom wall of the housing is held against radial expansion by an annular holding or clamping device forming part of and extending from the bottom wall of the housing toward the pressure plate. One of the arms, or an additional arm of the bottom wall, can serve to prevent rotation of the seats relative to the housing by extending into gaps between the end portions of the wire rings.

43 Claims, 4 Drawing Sheets

FRICTION CLUTCH

BACKGROUND OF THE INVENTION

The invention relates to friction clutches in general and, more particularly, to improvements in friction clutches which can be utilized in motor vehicles in the power trains between the prime movers and the wheels of such vehicles. Still more particularly, the invention relates to improvements in friction clutches of the type wherein a pressure plate is movable axially of and is rotatable with a housing which receives torque from a prime mover (e.g., a flywheel which is driven by the camshaft, crankshaft or another rotary output element of a combustion engine) and wherein a diaphragm spring is installed between the housing and the pressure plate to bias the latter against a clutch plate or clutch disc which is to transmit torque to a driven part, e.g., the input shaft of a variable-speed transmission, in the engaged condition of the clutch.

Friction clutches of the above-outlined character can further comprise a composite seat for an intermediate portion of the diaphragm spring. A radially outer portion of such spring bears against the pressure plate in the engaged condition of the clutch and a radially inner portion (particularly an inner portion including the free ends or tips of resilient prongs forming part of the spring and extending radially inwardly from the radially outer portion) can be moved axially of the housing (e.g., by a bearing or the like) to disengage the clutch. If the clutch is a so-called push-type clutch, the radially inner portion of the diaphragm spring must be depressed axially of the housing in a direction toward the pressure plate in order to disengage the clutch. The intermediate portion of the spring is tiltable relative to two coaxial seats of the composite seat including a first seat between a bottom wall or end wall of the housing and a second seat at that side of the intermediate portion of the spring which faces away from the bottom wall of the housing.

Friction clutches of the above outlined character are disclosed, for example, in published German patent applications Nos. 34 20 109 and 34 40 827, and in published British patent application No. 2 102 899. Reference may also be had to commonly owned U.S. Pat. No. 4,989,710 granted Feb. 5, 1991 to Reik et al. This patent shows a prime mover which drives the housing and a transmission receiving torque from the clutch plate or disc of the patented friction clutch. The disclosure of this patent is incorporated herein by reference.

OBJECTS OF THE INVENTION

An object of the invention is to provide a novel and improved friction clutch which is simpler and less expensive than, but just as reliable and as versatile as, heretofore known friction clutches.

Another object of the invention is to provide a novel and improved housing for use in the above-outlined friction clutch.

A further object of the invention is to provide a friction clutch which comprises fewer component parts than, but is just as versatile and just as reliable as, heretofore known friction clutches.

An additional object of the invention is to provide a novel and improved method of making the housing of the above-outlined friction clutch.

Still another object of the invention is to provide the friction clutch with novel and improved means for properly locating the seat or seats for the spring which is used in the above-outlined friction clutch to bias the pressure plate against the friction linings of a clutch disc in the engaged condition of the clutch.

A further object of the invention is to provide a novel and improved bottom wall or end wall for a housing which can be utilized in the above-outlined friction clutch.

Another object of the invention is to provide a friction clutch of the above-outlined character with a novel seat assembly for the clutch spring.

An additional object of the invention is to provide the above-outlined improved clutch with novel means for preventing uncontrolled movements of the seat or seats for the clutch spring relative to the housing.

Another object of the invention is to provide a motor vehicle which embodies a friction clutch of the above-outlined character.

Still another object of the invention is to provide a novel and improved power train, particularly a power train between an engine and the wheels of a motor vehicle, which embodies the above-outlined friction clutch.

A further object of the invention is to provide a novel and improved method of assembling certain component parts of the above-outlined friction clutch.

Another object of the invention is to provide a friction clutch, such as a push-type friction clutch, which is simpler, more compact and less expensive than heretofore known friction clutches which are utilized in the power trains between the engines and transmissions of motor vehicles.

An additional object of the invention is to provide novel means for holding the clutch spring and the seats for the clutch spring in requisite positions relative to each other in a friction clutch, particularly a push-type friction clutch, of the above-outlined character.

Still another object of the invention is to provide novel and improved means for tiltably mounting a clutch spring, particularly a diaphragm spring, between the housing and the pressure plate of the above-outlined friction clutch.

SUMMARY OF THE INVENTION

One feature of the present invention resides in the provision of an engageable and disengageable friction clutch comprising (a) a housing which is rotatable about a predetermined axis, (b) a pressure plate which is coaxial with and is connected to the housing so that it shares the angular movements of the housing about the predetermined axis, preferably with limited freedom of axial movement relative to the housing, and (c) a diaphragm spring which is disposed between the housing and the pressure plate and includes a radially outer portion bearing against the pressure plate in the engaged condition of the clutch, a radially inner portion of the spring (such inner portion can include a set of resilient prongs extending radially inwardly from the radially outer portion of the spring) being movable axially of the housing to thereby disengage the clutch, and an intermediate portion of the spring having a first side confronting the housing and a second side confronting the pressure plate. The improved friction clutch further comprises a composite seat for the intermediate portion of the diaphragm spring including a first annular seat between the housing and the first side and a second annular seat at the second side of the intermediate portion of the spring. At least one of the first and second seats has two end portions which are adjacent each other. The friction clutch further comprises means for coupling the seats and the intermediate portion of the spring to the housing. The coupling means comprises a plurality of components (hereinafter called arms for short) constituting stamped-out sections of the housing and having first portions extending substantially in the direction of the axis of the housing radially inwardly of the first and second seats and through openings (e.g., through the slots between the aforementioned radially inwardly extending prongs constituting or including the radially inner portion of the diaphragm spring) provided therefor in the spring. The arms of the coupling means further comprise second portions which extend from the first portions substantially radially outwardly of the axis of the housing and overlie the second seat to thus prevent the seats and the spring from moving relative to the housing radially inwardly toward and also in the direction of the axis of the housing. Still further, the improved friction clutch comprises means for clamping the first seat between the diaphragm spring and the housing against movement radially of and away from the axis of the housing. The clamping means is of one piece with the housing.

The arms of the coupling means can further comprise third portions which extend from the second portions and are radially outwardly adjacent the second seat to thus prevent movements of the second seat radially outwardly and away from the axis of the housing.

The housing includes a bottom wall or end wall which is adjacent the first seat, and each arm of the coupling means forming part of such housing can further include a root portion which is of one piece with the bottom wall and extends substantially tangentially of the first seat. The first portions of the arms are or can be at least substantially parallel to the axis of the housing.

The at least one seat can be installed between the housing and the intermediate portion of the diaphragm spring in such a way that each of its end portions is adjacent one of the arms. The arrangement can be such that both end portions of the at least one seat are adjacent one and the same arm. The end portions of the at least one seat can define a gap which extends in the circumferential direction of the at least one seat.

The housing can further comprise means for preventing rotation of at least one of the first and second seats relative to the housing. Such rotation preventing means can include means for form-lockingly attaching at least one of the first and second seats to the housing.

In accordance with a presently preferred embodiment of the invention, the means for preventing rotation of at least one of the seats relative to the housing and the coupling means are simultaneously formed portions of a converted blank which constitutes the housing. Such a blank can be made of metallic sheet material and can be converted into the housing, with simultaneous formation of the coupling means and of the rotation preventing means, in a stamping or other suitable machine.

The means for preventing rotation of at least one of the seats relative to the housing can comprise deformed portions of at least one of the arms and of the at least one seat, such as the seat which includes two adjacent end portions.

If the seat having two discrete end portions is the first seat, the means for preventing rotation of such seat relative to the housing can include a portion of an arm which is adjacent the end portions of the first seat.

The means for preventing rotation can include a single rotation preventing device including a first portion for preventing rotation of the first seat and a second portion for preventing rotation of the second seat.

The rotation preventing means and the clamping means can constitute simultaneously formed portions of a converted blank which constitutes the housing of the improved friction clutch.

The clamping means can comprise an annulus which surrounds the first seat and includes sections alternating with the arms of the coupling means in the circumferential direction of the seats.

The arms of the coupling means can include parts having different thicknesses.

At least one of the annular seats can have an oval, triangular or other polygonal cross-sectional outline and can constitute a substantially circular hollow tubular body.

Another feature of the present invention resides in the provision of an engageable and disengageable clutch, particularly for use in motor vehicles to transmit torque from a prime mover (such as a combustion engine) to a variable-speed transmission in the power train between the prime mover and the wheels of the motor vehicle. The improved friction clutch comprises (a) a housing which is rotatable about a predetermined axis, (b) a pressure plate which is coaxial with and is connected to the housing with at least some freedom of movement in the direction of the axis, and (c) a diaphragm spring which is disposed between the housing and the pressure plate and includes a radially outer portion bearing against the pressure plate in the engaged condition of the clutch, a radially inner portion (e.g., constituted by the free end portions of the aforementioned prongs forming part of the diaphragm spring) which is movable axially of the housing to disengage the clutch, and an intermediate portion having a first side confronting the housing and a second side confronting the pressure plate. The clutch further comprises a composite seat which tiltably mounts the intermediate portion of the diaphragm spring and includes a first annular seat between the housing and the first side of the intermediate portion and a second annular seat at the second side of the intermediate portion of the spring. Each of the first and second seats comprises or constitutes a wire ring and at least one of these rings has two end portions adjacent, but not connected to each other. The clutch further comprises means for coupling the seats and the intermediate portion of the spring to the housing. Such coupling means includes a plurality of arms forming part of the housing and having first portions extending substantially in the direction of the predetermined axis radially inwardly of the first and second seats and through openings which are provided therefor in the spring. The arms further comprise second portions extending from the first portions substantially outwardly and away from the axis and overlying the second seat to thus prevent the seats and the spring from moving relative to the housing radially inwardly toward the axis as well as in the direction of such axis. Still further, the clutch comprises means for holding the first seat between the diaphragm spring and the housing against movement radially of and away from the axis, and such holding means is of one piece with the housing. The second seat can be held against movement radially of and away from the predetermined axis by third portions of the arms, and such third portions extend from the respective second portions and are radially outwardly adjacent the second seat. The housing further comprises means for preventing rotation of at least one of the rings relative to the housing.

The housing includes a bottom wall or end wall which is adjacent the first seat and each arm of the coupling means preferably includes a root portion which is of one piece with the bottom wall and extends substantially tangentially of the first seat. The first portions of such arms are or can be at least substantially parallel to the axis of the housing.

The arms can constitute stamped-out sections of the housing.

The wire ring of at least one of the seats can constitute a circular ring and the end portions of the respective ring can be spaced apart from each other, i.e., such ring can constitute a split ring with a gap between its end portions.

The means for preventing rotation of at least one of the rings relative to the housing can include means for form-lockingly attaching at least one of the first and second seats to the housing. The coupling means and the means for preventing rotation can constitute simultaneously formed portions of a converted blank which is the housing of the friction clutch.

The means for preventing rotation can comprise deformed portions of at least one of the arms and of the at least one seat including the split ring.

The ring which constitutes a split ring can form part of or can constitute the first seat, and the means for preventing rotation can include a portion of an arm which is adjacent the end portions of the split ring.

The means for preventing rotation can include a single rotation preventing device including a first portion which serves to prevent rotation of one of the rings and a second portion which serves to prevent rotation of the other ring.

The means for preventing rotation and the holding means can constitute simultaneously formed portions of a converted blank which constitutes the housing.

The holding means can comprise an annulus which surrounds the first seat and includes sections alternating with the arms of the coupling means in the circumferential direction of the seats.

The arms of the coupling means can include parts having different thicknesses and at least one of the wire rings can have a non-circular cross-sectional outline.

A further feature of the present invention resides in the provision of a repeatedly engageable and disengageable friction clutch which can be utilized in motor vehicles and comprises (a) a housing rotatable about a predetermined axis, (b) a pressure plate which is coaxial to and is rotatable with the housing and is also movable relative to the housing in the direction of the predetermined axis, and (c) a diaphragm spring which is disposed between the housing and the pressure plate and includes a radially outer portion bearing against the pressure plate in the engaged condition of the clutch, a radially inner portion movable axially of the housing to disengage the clutch, and an intermediate portion having a first side confronting the housing and a second side confronting tho pressure plate. The improved friction clutch further comprises a composite seat which tiltably mounts the intermediate portion of the diaphragm spring and includes a first annular seat between the housing and the first side of the intermediate portion and a second annular seat at the second side of the intermediate portion, and means for coupling the seats and the intermediate portion of the spring to the housing. The coupling means comprises a plurality of arms forming part of the housing and having first portions extending substantially in the direction of the predetermined axis radially inwardly of the seats and through openings which are provided therefor in the diaphragm spring. The arms further comprise second portions extending from the respective first portions substantially radially outwardly of the predetermined axis and overlying the second seat to thus prevent the seats and the diaphragm spring from moving relative to the housing radially inwardly toward as well as in the direction of the predetermined axis. The arms also comprise third portions which extend from the respective second portions and are radially outwardly adjacent the second seat to thus prevent movements of the second seat radially outwardly and away from the predetermined axis. The clutch further comprises means for holding the first seat between the housing and the diaphragm spring against movement radially of and away from the predetermined axis. The holding means is of one piece with the housing and comprises a substantially axially extending holding device which constitutes a part of the housing and surrounds the first seat. The housing includes a first portion having a first thickness and second portions which alternate with the arms of the coupling means in the circumferential direction of the seats and have a second thickness less than the first thickness.

The arms can constitute stamped-out sections of the housing.

At least one of the seats can constitute a substantially circular wire ring having two end portions which are adjacent but are not connected to each other.

The housing includes a bottom wall which is adjacent the first seat and each of the aforementioned arms further includes a root portion which is of one piece with the bottom wall and extends substantially tangentially of the first seat. The first portions of such arms are or can be at least substantially parallel to the predetermined axis.

At least one of the seats can include or constitute a wire ring having two end portions which are adjacent each other, and each end portion of such ring is or can be adjacent one of the arms. The arrangement is or can be such that both end portions of the wire ring are adjacent one and the same arm.

The friction clutch can further comprise means for preventing rotation of the seats relative to the housing, and such means for preventing rotation can include means for form-lockingly attaching at least one of the seats to the housing. The coupling means and the means for preventing rotation can constitute simultaneously formed portions of a converted blank which constitutes the housing. The means for preventing rotation can constitute or comprise deformed portions of at least one of the arms and of at least one of the seats. The means for preventing rotation can include a first portion which prevents rotation of the first seat and a second portion which prevents rotation of the second seat relative to the housing. The first portion of the means for preventing rotation can be disposed between two arms of the coupling means. The means for preventing rotation can be constructed and configured in such a way that it includes a single rotation preventing device comprising a first portion which prevents rotation of the first seat and a second portion which prevents rotation of the second seat relative to the housing.

The means for preventing rotation and the holding means can constitute simultaneously formed portions of a converted blank which constitutes the housing.

The holding means can include an annulus which surrounds the first seat and includes sections alternating with the arms, as seen in the circumferential direction of the seats.

At least one of the seats can have an oval, a triangular or another polygonal cross-sectional outline which departs from a truly circular cross-sectional outline. Furthermore, at least one of the seats can constitute a substantially circular tube consisting of a metallic or other suitable material.

BRIEF DESCRIPTION OF THE DRAWINGS

The novel features which are considered as characteristic of the invention are set forth in particular in the appended claims. The improved friction clutch itself, however, both as to its construction, its mode of operation and the method of making and assembling the same, together with additional novel features and advantages thereof, will be best understood upon perusal of the following detailed description of certain presently preferred specific embodiments with reference to the accompanying drawings, wherein:

FIG. 7 is an enlarged view of a seat having a non-circular cross sectional outline.

DESCRIPTION OF PREFERRED EMBODIMENTS

Figure 1:
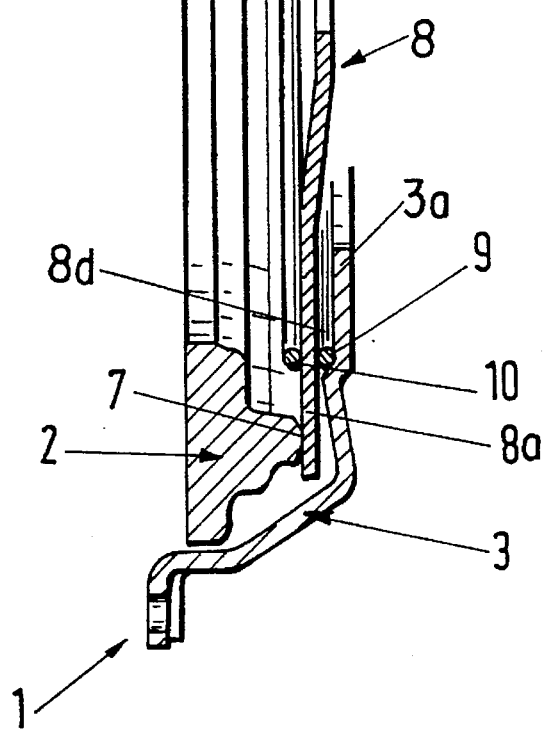
FIG. 1 is a fragmentary axial sectional view of a friction clutch which embodies one form of the invention.
Figure 2:
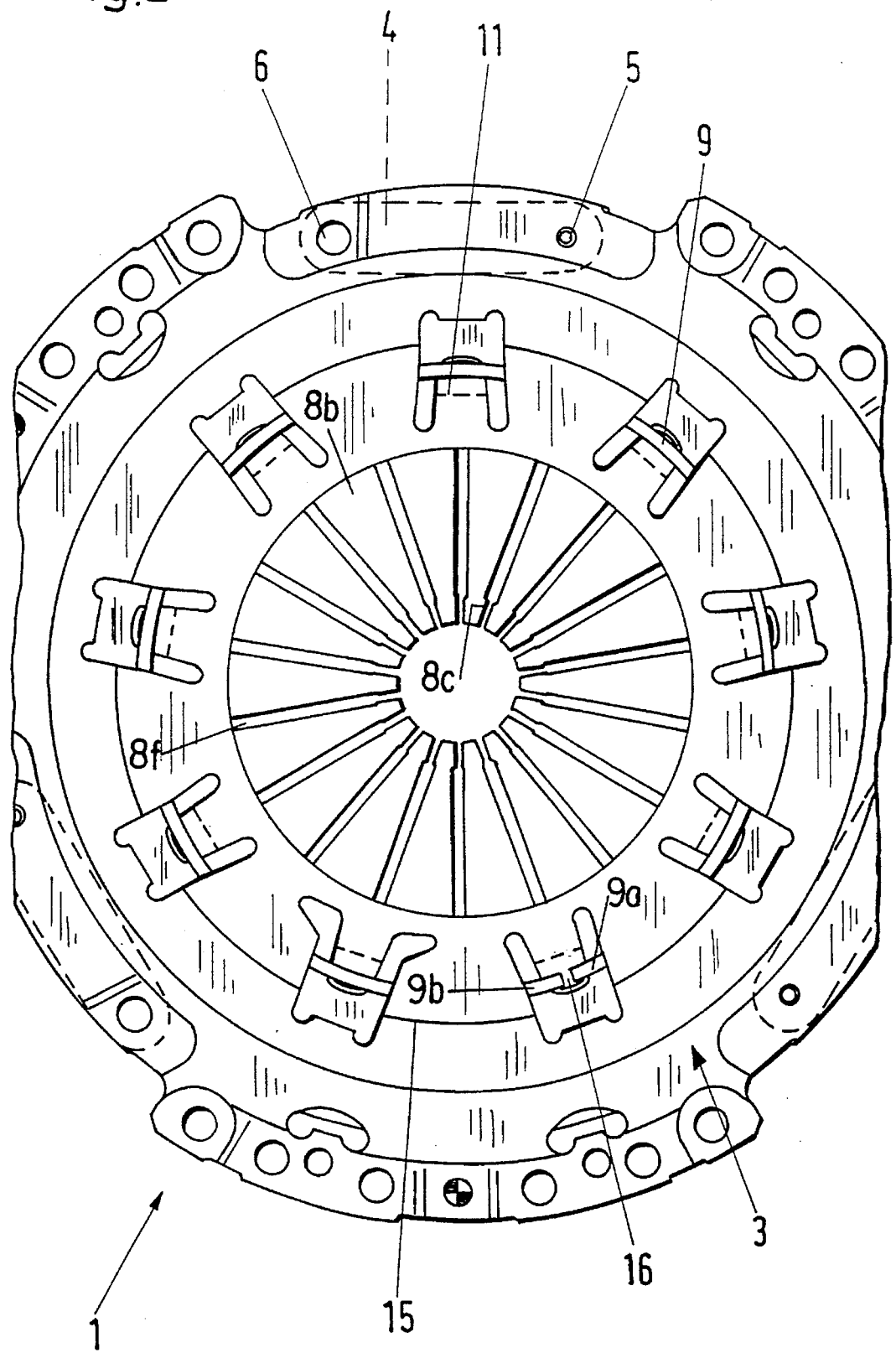
FIG. 2 is a fragmentary end elevational view of the friction clutch, substantially as seen in the direction of arrow II in FIG. 1.

FIGS. 1 and 2 illustrate certain portions of a friction clutch 1 which can be utilized in a motor vehicle (e.g., in a manner as described and shown in the aforementioned U.S. Pat. No. 4,989,710 to Reik et al.) and embodies one form of the present invention. The illustrated portion of the friction clutch 1 comprises a rotary housing or cover 3 which is or which can constitute a converted blank of suitable metallic sheet material and which is rotatable about an axis X—X when driven by a prime mover, e.g., an internal combustion engine in a motor vehicle wherein the output element (such as a crankshaft or a camshaft) drives a single flywheel or a composite flywheel constituting a counterpressure plate that is non-rotatably connected to the housing 3. A pressure plate 2 is non-rotatably affixed to the housing 3 with limited freedom of movement in the direction of the axis X—X. When the friction clutch 1 is engaged, its clutch spring 8 bears against projections 7 of the pressure plate 2 and urges the latter against the adjacent friction linings of a clutch plate or clutch disc (not shown), to thus urge the clutch disc against the counterpressure plate (not shown) so that the clutch disc can transmit torque to a driven part, e.g., to the input shaft of a variable-speed transmission in the power train between the engine and the wheels of a motor vehicle.

The means for non-rotatably, but axially movably, attaching the pressure plate 2 to the housing 3 includes a set of leaf springs 4 each having one of its end portions secured to the pressure plate 2 by a rivet 5 and its other end portion secured to the marginal portion of the housing 3 by a rivet 6.

The projections 7 which are shown in FIG. 1 constitute circumferentially spaced apart raised portions or cams of the pressure plate 2. However, such projections can be replaced with a single circumferentially complete rib which is biased by the clutch spring 8 at least in the engaged condition of the friction clutch 1, thereby clamping the friction linings of the clutch disc between the pressure plate 2 and the counterpressure plate.

The friction clutch 1 further comprises a composite seat which tiltably mounts an intermediate portion 8d of the clutch spring 8; the illustrated clutch spring is a diaphragm spring having a radially outer portion 8a which is a circumferentially complete washer and is adjacent the projections 7 of the pressure plate 2. The radially inner portion of the spring 8 includes a set of resilient prongs 8b which extend radially inwardly from the intermediate portion 8d and which have free end portions or tips 8c (FIG. 2). The illustrated friction clutch 1 is a so-called push-type clutch, i.e., the tips 8c of the prongs 8b must be depressed (e.g., by a bearing) in a direction to the left, as viewed in FIG. 1, in order to disengage the clutch. As the tips 8c of the prongs 8b are depressed axially of the housing 3 toward the pressure plate 2, the intermediate portion 8d of the spring 8 is tilted between the two annular seats 9, 10 of the composite seat so that the radially outer portion 8a of the spring 8 permits the leaf springs 4 to move the pressure plate 2 axially of and toward the housing 3. This enables the pressure plate 2 and the counterpressure plate to rotate relative to the clutch disc and/or vice versa, i.e., the transmission of torque between the prime mover (which drives the counterpressure plate, the pressure plate 2, the diaphragm spring 8 and the housing 3) and the clutch disc is interrupted.

Each of the two seats 9, 10 is a wire ring having an at least substantially circular cross-sectional outline. However, it is equally within the purview of the invention to employ seats in the form of wire rings having an oval, triangular or other polygonal cross-sectional outline. Reference may be had to FIG. 7 which shows a wire ring 9' having a non-circular cross sectional outline. Furthermore, the ring 9 and/or the ring 10 can constitute a suitably deformed length of tubing. If the ring 9 and/or 10 has a polygonal cross-sectional outline, it is or it may be advisable to round the edges between neighboring sides or facets of such seat. The illustrated seats or rings 9, 10 are made of a suitable metallic material and are solid, i.e., they do not have one or more longitudinally extending channels.

The means for coupling the seats 9, 10 and the intermediate portion 8d of the clutch spring 8 to the bottom wall or end wall 3a of the housing 3 includes a set of circumferentially spaced apart components in the form of arms 11 each of which is of one piece with the housing 3. The arms 11 are obtained by providing the blank which is to be converted into the housing 3 with a circular array of substantially U-shaped cutouts and by thereupon bending the thus obtained arms 11 out of the general plane of the bottom wall 3a of the housing. If the conversion of the blank into the housing 3 involves a stamping operation, the making of cutouts around the arms 11 is preferably carried out in the course of such stamping operation. The next step involves deformation of the arms 11 so that each such arm includes a first portion 12 extending in substantial or exact parallelism with the axis X—X and located within the seats 9 and 10. To this end, the diaphragm spring 8 is provided with openings 14 which permit the first portions 12 of the arms 11 to pass therethrough intermediate the seats 9 and 10, as seen in the direction of the axis X—X. The openings 14 can constitute suitably enlarged or shaped radially outermost portions of substantially radially extending slots 8f between the prongs 8b constituting the radially inner portion of the spring 8.

The first portions 12 of the arms 11 extend in a direction from the bottom wall 3a of the housing 3 toward the pressure plate 2 and carry second portions 12a which extend radially outwardly (i.e., away from the axis X—X) and overlie that side of the seat 10 which is disposed between the intermediate portion 8d of the spring 8 and the pressure plate 2. The bending of portions 12a of the arms 11 radially outwardly to overlie the seat 10 is carried out subsequent to the assembly of a module including the housing 3, the seat 9 between the intermediate portion 8d of the spring 8 and the bottom wall 3a, and the seat 10 adjacent that side of the intermediate portion 8d which confronts the pressure plate 2. Once the portions 12a of the arms 11 extend radially outwardly, the just mentioned module is ready to be assembled with the counterpressure plate and with the pressure plate 2 so that the pressure plate is located between the counterpressure plate and the seat 10 and the clutch disc is located between the friction surfaces of the pressure plate and the counterpressure plate.

Parts of the first portions 12 and/or the second portions 12a of the arms 11 are or can be thinner than the remaining parts (including the bottom wall 3a) of the housing 3. The portions 12 and 12a of the arms 11 cooperate to ensure that the seats 9, 10 and the portions 8a, 8d of the diaphragm spring 8 are held against movement radially inwardly toward the axis X—X as well as to ensure that the seats 9, 10 and the intermediate portion 8d of the spring 8 cannot move in the direction of such axis, i.e., away from the bottom wall 3a and toward the pressure plate 2.

Each of the illustrated arms 11 of the coupling means for the seats 9, 10 and the diaphragm spring 8 further comprises a third portion 13 which extends from the respective second portion 12a toward the bottom wall 3a of the housing 3 and is thus located radially outwardly of the seat 10. This ensures that the seat 10 (which can constitute a split wire ring) cannot move (expand) radially outwardly away from the axis X—X of the housing 3.

The arms 11 of the means for coupling the seats 9, 10 and the intermediate portion 8d of the diaphragm spring 8 to the housing 3 cooperate with the bottom wall 3a and with the intermediate portion 8d to hold the seat 9 against movement in the direction of, as well as radially inwardly toward, the axis X—X. However, and since the seat 9 is a split ring with end portions 9a, 9b which are adjacent but not connected to each other (they define a clearance or gap 16 extending in the circumferential direction of the seat 9), it is desirable to ensure that the seat 9 be held or clamped against expansion, i.e., against movement radially of and away from the axis X—X. In accordance with a feature of the invention, the bottom wall 3a is of one piece with an annular clamping or holding device 15 which extends from the plane of the bottom wall 3a toward the pressure plate 2 and surrounds at least a certain portion of the seat 9. As can be seen in FIG. 2, the illustrated holding or clamping device is an annulus which is interrupted at the locations of the cutouts for the making of the arms 11 of the aforediscussed coupling means. The device 15 is preferably formed simultaneously with the cutouts for the arms 11, i.e., during conversion of the aforediscussed blank into the housing 3 in a stamping or other suitable shaping machine. The dimensions of the device 15 are or can be such that the seat 9 is positively held against expansion, i.e., against undue widening of the gap 16 between the end portions 9a, 9b of the wire ring which constitutes the seat 9. Analogously, the extent of deformation of the arms 11 (to form the portions 12, 12a and 13) can be such that the portions 12a bias the seat 10 toward the intermediate portion 8d and thus bias the seat 9 against the bottom wall 3a of the housing 3.

An important advantage of a seat which constitutes a split ring with a gap 16 between its end portions (such as the end portions 9a, 9b of the ring constituting the seat 9) is that the split ring can undergo thermally induced expansion or contraction without affecting its ability to properly mount the intermediate portion 8d of the diaphragm spring 8. Otherwise stated, the effective diameter of the composite seat including two seats at least one of which is a split ring remains at least substantially unchanged because the split ring is free to change (increase or reduce) its diameter due to the fact that its end portions are not welded or otherwise permanently affixed to each other.

It is often desirable to ensure that the seat 9 and/or 10 be held against angular movement relative to the housing 3. This can be achieved by establishing a form-locking connection which acts as a barrier, i.e., as a means for preventing rotation of the seat 9 and/or 10 relative to the bottom wall 3a. For example, a portion of an arm 11 and an adjacent portion of the bottom wall 3a of the housing 3 can be deformed to an extent which is necessary to penetrate into the gap 16 and to thus hold the seat 9 against rotation relative to the housing. The deformed portion of an arm 11 and/or of the adjacent part of the bottom wall 3a can be dimensioned in such a way that the seat 9 is still free to expand or contract in response to heating or cooling so that it can serve as a satisfactory fulcrum for the intermediate portion 8d of the diaphragm spring 8.

Of course, it is also possible to rely on the deformed arms 11 as the only means for preventing rotation of the seat 9 and/or 10 relative to the housing 3. Thus, the second portions 12a of the arms 11 can bear against the adjacent portions of the seat 10 with a force which ensures that the seat 10 is biased against the adjacent side of the intermediate portion 8d, that the other side of the intermediate portion 8d is biased against the seat 9, and that the seat 9 is biased against the bottom wall 3a with a force which ensures that the seats 9, 10 and the diaphragm spring 8 cannot rotate relative to each other and/or relative to the housing 3. An advantage of using the portions 12a of the arms 11 as a means for preventing rotation of the seats 9, 10 and the diaphragm spring 8 relative to each other and/or relative to the housing 3 is that the angular positions of the end portions 9a, 9b relative to the bottom wall 3a (i.e., relative to the arms 11 ) can be selected at will. On the other hand, if one of the arms 11 is to be deformed so that it constitutes or forms part of the means for preventing rotation of the seat 9 relative to the bottom wall 3a and relative to the diaphragm spring 8 because a portion of the deformed arm 11 extends into the gap 16, it is necessary to properly position the end portions 9a, 9b relative to one of the arms 11 in order to ensure that appropriate deformation of such one arm will result in the penetration of a portion of the one arm into the gap 16. In other words, the assembling of the spring 8 with the seats 9, 10 and the housing 3 into a module can be simplified if one of the arms 11 need not actually extend into the gap 16.

The illustrated arms 11 constitute but one form of means for coupling the seats 9, 10 and the spring 8 to the housing 3 by relying on coupling means forming part of (i.e. , of one piece with) the housing. All that counts is that the selected coupling means confine the seats 9 and 10 against undesirable movements relative to the housing 3 at least in directions radially toward or away from the axis X—X.

The feature that the arms 11 include thicker and thinner portions exhibits the advantage that the arms can be more readily shaped to provide portions 12, 12a and 13 of desired size and shape. In other words, by properly selecting the thickness of various parts of the arms 11, one can more readily ensure that the portions 12, 12a and 13 of each arm 11 will be inclined relative to each other to an optimum extent and at optimal distances from the bottom wall 3a.

The arms 11 include root portions 11a which can be said to constitute simple hinges extending substantially tangentially or chordally (hereinafter called tangentially) of the seat 9 and constituting the junctions between the arms and the bottom wall 3a.

It is further possible to replace the illustrated clamping or holding device 15 with a device which is interrupted not only at the arms 11 but also in the spaces between pairs of neighboring arms. All that counts is to ensure that the selected device 15 will reliably prevent undue radial expansion of the seat 9 in response to heating or for any other reason while the portions 12a of the arms 11 hold the seats 9, 10 and the intermediate portion 8d of the spring 8 against movement in the direction of the axis X—X.

The seat 10 can also include or constitute a split ring analogous to or identical with the split ring of the seat 9. One of the arms 11 is then provided (or can be provided) with an upset or otherwise formed portion which extends into the gap between the end portions of the split ring constituting or forming part of the seat 10 so that the latter is positively held against rotation relative to the housing 3.

The utilization of seats which constitute split rings brings about the aforementioned advantages as well as the additional advantage that the split rings need not be treated prior to assembly with the diaphragm spring 8 and the housing 3. Thus, it is now possible to dispense with the welding of the two end portions of wire rings to each other and it is also possible to dispense with the grinding and/or analogous treatment of the welded-together end portions of a wire ring which is to be used as a seat for the diaphragm spring of a friction clutch. All that is necessary is to subdivide a length of wire having a desired cross-sectional outline into sections of requisite length and to thereupon convert such sections into split rings which are ready for assembly with the diaphragm spring and with the housing of a friction clutch without any special treatment of the end portions of such split rings.

Another important advantage of the improved friction clutch is that the seats in the form of split rings can compensate for tolerances in the making of such seats as well as for tolerances during assembly of the seats with a diaphragm spring and a clutch housing. In other words, the diameter of a split ring (such as that constituting the seat 9) need not exactly match an optimum diameter because the ability of the split ring to increase or reduce its diameter during assembly of the module suffices to ensure that the diameter of the seat matches an optimum value when the assembly of the module including the seats, the housing and the diaphragm spring into a module is completed. The coupling means including the deformed arms 11 and the clamping or holding device 15 then ensure that the diameter of each seat which includes or constitutes a split ring matches an optimum value.

The aforediscussed configuration of the arms 11, namely that each arm includes at least one portion of lesser thickness and at least one portion of greater thickness, is preferably achieved without resorting to a material removing operation. Thus, such configuration of the arms 11 can be arrived at during conversion of a blank into a housing or cover 3 in a suitable stamping or other shaping machine.

If each of the seats 9, 10 constitutes a split wire ring, and if the coupling means is to prevent rotation of such split rings relative to the bottom wall 3a of the housing 3, it is desirable to install the two split rings in such a way that the end portions 9a, 9b of the split ring or seat 9 are aligned with the end portions of the other split ring constituting or forming part or including the seat 10. This renders it possible to prevent rotation of the two split rings relative to the housing 3 by simply deforming a single arm 11 (particularly the first portion 12 of such single arm) for the purpose of causing parts of the portion 12 to penetrate into the gaps between the end portions of both split rings.

In order to take into consideration eventual tolerances in connection with the making of the seats 9, 10, in connection with the assembly of the module including the seats 9, 10, the diaphragm spring 8 and the housing 3, and in connection with the assembly of such module with other parts (such as the pressure plate 2 and the counterpressure plate) of the friction clutch, it is advisable to form the split ring(s) constituting the seat 10 and/or 9 in such a way that the free end portions of each split ring define a gap 16 having a width not less than a predetermined minimum width.

The cost of making and assembling the friction clutch can be reduced to an unexpectedly large extent if the coupling means including the arms 11, the holding or clamping means including the device 15 and (if used at all) the means for preventing rotation of the diaphragm spring and the seats relative to each other and/or relative to the housing 3 are formed simultaneously with conversion of a blank into the housing 3. All that remains is to assemble the module including the spring 8, the housing 3 and the seats 9, 10 and to thereupon deform the arms 11 to provide the portions 12, 12a and 13, i.e., to complete the installation of the seats 9, 10 and the intermediate portion 8d of the diaphragm spring 8 between the portions 12a of the deformed arms and the bottom wall 3a of the housing 3 and to simultaneously complete the retention of the seat 10 in an optimum position by preventing this seat from expanding radially outwardly of and away from the axis X—X.

The means for preventing rotation of the seats 9, 10 relative to the housing 3 can be formed by deforming selected portions of a single arm 11 so that the deformed portions penetrate into the gap 16 between the end portions 9a, 9b of the wire ring including or constituting the seat 9 and into the gap between the end portions of the wire ring constituting or including or forming part of the seat 10.

Of course, it is equally within the purview of the invention to provide the bottom wall 3a of the housing 3 with discrete rotation preventing means, namely with rotation preventing means other than selected portions of one or more arms 11. For example, if the end portions 9a, 9b of the wire ring including, forming part of or constituting the seat 9 adjacent the inner side of the bottom wall 3a are located between and are spaced apart from two neighboring (first portions 12 of the) arms 11, the bottom wall 3a can be deformed so that a portion thereof penetrates into the gap 16 to thus hold the seat 9 against any angular movements or against undue angular movements relative to the housing 3. Again, such rotation preventing means are preferably formed simultaneously with the conversion of a blank into the housing 3.

It is presently preferred, particularly for the sake of greater economy, to provide a single rotation preventing device (e.g., one of the first portions 12) having a first portion serving to prevent rotation of the seat 9 and a second portion serving to prevent rotation of the (split ring of the) seat 10 relative to the housing 3.

Selective reduction of the thickness of certain portions of the arms 11 for the purpose of facilitating highly predictable bending of the portions 12a and 13 relative to the respective portions 12 and 12a constitutes an optional but highly desirable and advantageous feature of the improved friction clutch, and more particularly of the method of making and assembling the clutch.

FIGS. 3 to 6 illustrate certain details of a modified friction clutch 101. All such component parts of the clutch 101 which are identical with or clearly analogous to the corresponding parts of the friction clutch 1 are denoted by similar reference characters plus 100. The mode of assembling and the mode of operating the friction clutch 101 are also analogous to the mode of assembling and the mode of operating the clutch 1. The illustrated clutch 101 is also a push-type clutch, i.e., the inner end portions or tips 108c of the prongs 108b forming part of the diaphragm spring 108 must be depressed in the direction of the axis X—X of the housing 103 and toward the pressure plate 102 in order to disengage the clutch 101. In other words, the diaphragm spring 108 also acts as a two-armed lever which is fulcrumed by the seats 109, 110 of the composite seat, which includes an outer arm or portion 108a bearing against the projection or projections 107 of the pressure plate 102 when the clutch 101 is engaged, and which includes a radially inner arm (prongs 108b and their tips 108c) which must be depressed toward the pressure plate 102 in order to disengage the clutch.

The seats 109, 110 are split wire rings which are held against radial movement toward the axis X—X of the housing 103 by the first portions 112 of the arms 111 and which are held against movement axially of and away from the bottom wall 103a of the housing 103 by the second portions 112a of the arms 111. The arms 111 further include third portions 113 which are disposed radially outwardly of the seat 110 and prevent undue radial expansion of such seat in a direction away from the axis of the housing 103. The seats 109, 110 are disposed at opposite sides of the intermediate portion 108d of the diaphragm spring 108. The arms 111 are of one piece with the bottom wall 103a of the housing 103, and the holding or clamping means 115 for the seat 109 are also of one piece with the bottom wall 103a.

Figure 3:
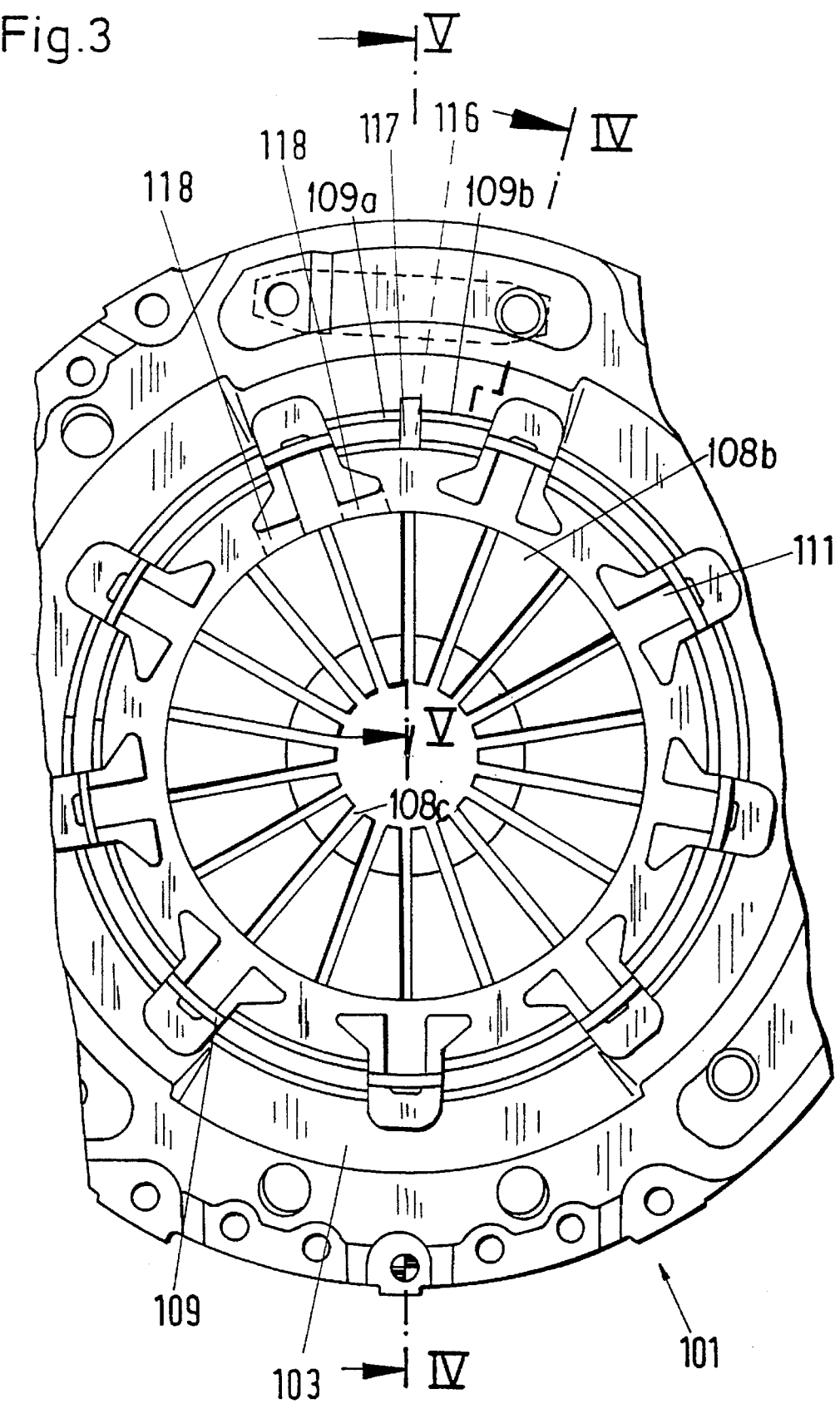
FIG. 3 is a fragmentary end elevational view of a modified friction clutch.
Figure 4:
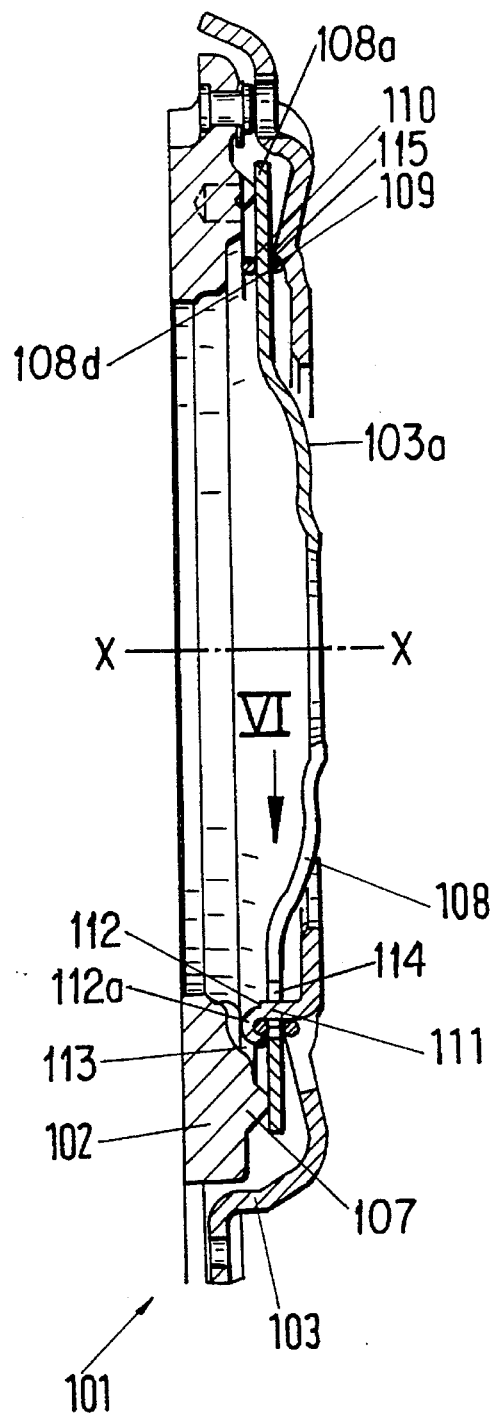
FIG. 4 is a fragmentary axial sectional view, substantially as seen in the direction of arrows from the line IV—IV in FIG. 3.

FIG. 3 illustrates the clearance or gap 116 between the end portions 109a, 109b of the wire ring constituting, forming part of or including the seat 109 between the inner side of the bottom wall 103a and the respective side of the intermediate portion 108d of the diaphragm spring 108.

The means for preventing rotation of the seats 109 and 110 relative to the housing 103 is shown at 117. The illustrated rotation preventing means includes an arm 111 or a similar arm (117) which is bent out of the general plane of the bottom wall 103a so that it extends into the gap 116 between the end portions 109a, 109b of the seat 109 as well as into the gap (not specifically shown) between the end portions (not specifically shown) of the seat 110. The rotation preventing device 117 is also of one piece with the housing 103 and is preferably formed simultaneously with the arms 111 and the holding or clamping device 115 during conversion of a sheet metal blank into the housing 103, e.g., in a stamping machine. It is clear that the diaphragm spring 108 is provided with a suitable opening for the passage of an intermediate portion of the rotation preventing device or arm 117 so that the latter can extend into the gap 116, through the adjacent portion of the spring 108 and into the gap of the seat 110. It will be seen that the rotation préventing device 117 is located at a slightly greater distance from the axis X—X of the housing 103 than the arms 111 of the clamping means because the device 117 must extend into the gap 116 and into the aligned gap of the wire ring forming part of, including or constituting the seat 110. Of course, it is equally possible to dispose the device 117 at the same radial distance from the axis X—X as the arms 111 and to provide such device 117 with radially outwardly extending portions one of which extends into the gap 116 and the other of which extends into the gap of the seat 110. The device 117 can be said to establish a reliable form-locking connection between the housing 103, the intermediate portion 108d of the diaphragm spring 108 and the seats 109, 110 in that it extends from the inner side of the bottom wall 103a, through the gap 116, through the aforementioned opening of the spring 108 and through the gap of the seat 110. Such form-locking connection can be established in a simple time- and material-saving manner by utilizing the material of the housing 103 and by preferably forming the connection 117 simultaneously with the making of the arms 111 and of the holding or clamping device 115 during conversion of the aforementioned blank into the housing 103.

An important advantage of a rotation preventing device 117 which is not part of one of the arms 111 is that the means for preventing rotation of the seats 109, 110 and diaphragm spring 108 relative to the housing 103 cannot interfere with the operation of coupling means (arms 111) serving to hold the parts 108, 109, 110 against radially inward movement toward the axis X—X, to hold the parts 108, 109, 110 against movement in the direction of the axis X—X toward the pressure plate 102, and to prevent radial expansion of the part 110 away from the axis X—X.

Figure 5:
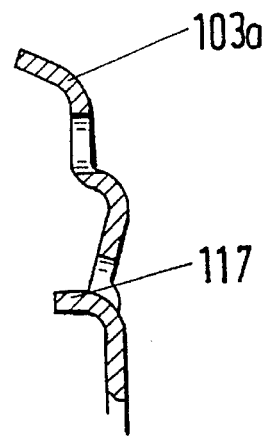
FIG. 5 is an enlarged fragmentary sectional view of a detail, substantially as seen in the direction of arrows from the line V—V in FIG. 3.

FIG. 5 shows a presently preferred form of the rotation preventing device 117. This device is an integral part of the bottom wall 103a and extends toward the pressure plate 102 (not shown in FIG. 5) so that it can enter the gap 116 of the seat 109 and the gap of the seat 110 and that it can also pass through the opening of the diaphragm spring 108.

Figure 6:
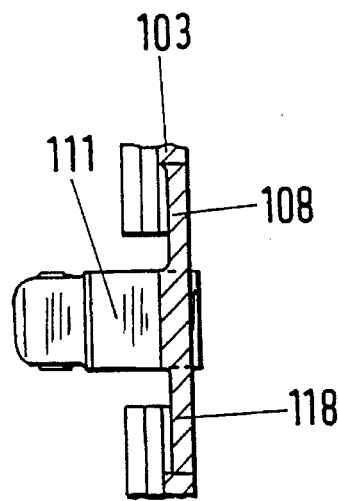
FIG. 6 is an enlarged sectional view of a detail, substantially as seen in the direction of arrow VI in FIG. 4.

FIG. 6 shows that the arm 111 which can be seen therein is disposed between two sections or portions 118 extending all the way to the radially innermost portion of the bottom wall 103a. The wall thickness of each section 118 is less than the wall thickness of the adjacent portion of the housing 103, i.e., less than the wall thickness of the major part of the bottom wall 103a. The thickness of the sections 118 of the housing 103 can be reduced by appropriate calibration or in any other suitable way. It is preferred to form the sections 118 without actually removing material from the bottom wall 103a, namely by shifting some of the material of the bottom wall 103a so as to ensure that the wall thickness of the sections 118 is less than that of the major portion of the bottom wall. By reducing the thickness of the sections 118 below that of the major portion of the bottom wall 103a, the elasticity of the respective portion of the housing 103 departs from that of the other parts of the housing. The sections 118 can be made to constitute torsion bars or to act not unlike torsion bars for the purpose of biasing the respective arms 111 of the housing 103. Properly biased arms 111 can be caused to ensure that their portions 112a bear against the adjacent seat 110 in a direction to urge the seats 110, 109 and the intermediate portion 108d of the diaphragm spring 108 toward the inner side of the bottom wall 103a. This ensures that the intermediate potion 108d of the spring 108 is confined between the seats 109, 110 with little play or no play at all. The exact magnitude of the forces which the arms 111 exert upon the seat 110 in a direction toward the bottom wall 103a can be readily selected by appropriate calibration and wall thickness selection of the sections 118.

Another advantage of the sections 118 and of the aforediscussed mode of making such sections is that the displaced material of the bottom wall 103a (i.e., the material which is shifted to reduce the wall thickness of the sections 118) enhances the stability of the adjacent portions (such as the arms 111) of the housing 103. In other words, the bias of the arms 111 can be increased by "lengthening" their characteristic curves.

Each and every arm 111 of the housing 103 can be flanked by a pair of sections 118. Furthermore, such thin-walled sections can be utilized with equal advantage in the friction clutch 1 of FIGS. 1 and 2 as well as in any other friction clutches wherein the seats are biased toward each other and toward the bottom wall of the housing.

The improved friction clutch is susceptible of numerous other modifications without departing from the spirit of the present invention. For example, and as already mentioned hereinbefore, the features of the friction clutch 1 can be incorporated into the friction clutch 101 or vice versa. Furthermore, certain combinations of elements in the friction clutch 1 or 101 are believed to be sufficiently novel and unobvious to warrant independent patent protection in addition to that sought for by the appended claims. Moreover, certain features or combinations of features disclosed in connection with the friction clutches 1 and 101 can be incorporated into certain types of presently known friction clutches to thus patentably improve the construction, the mode of assembling and the mode of operation of the thus modified conventional friction clutches as well as to reduce their initial and maintenance cost.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An engageable and disengageable friction clutch comprising: a housing rotatable about a predetermined axis; a pressure plate coaxial with and connected to said housing with limited freedom of movement in the direction of said axis; a diaphragm spring disposed between said housing and said pressure plate and including a radially outer portion bearing against said pressure plate in the engaged condition of the clutch, a radially inner portion movable axially of said housing to disengage the clutch, and an intermediate portion having a first side confronting said housing and a second side confronting said pressure plate; a composite seat for said intermediate portion including a first annular seat between said housing and said first side and a second annular seat at said second side of said intermediate portion, at least one of said first and second seats having two end portions facing each other; means for preventing rotation of at least one of said first and second seats relative to the housing including a member disposed between said end portions of said at least one seat; means for coupling said seats and said intermediate portion to said housing including a plurality of arms constituting stamped-out sections of said housing and having first portions extending substantially in the direction of said axis radially inwardly of said first and second seats and through openings provided in said spring, said arms further having second portions extending from the respective first portions radially outwardly of said axis and overlying said second seat to thus prevent said seats and said spring from moving relative to said housing substantially radially and in the direction of said axis, said arms further having third portions extending from the respective second portions and being radially outwardly adjacent said second seat to thus prevent movements of said second seat radially outwardly and away from said axis; and means for clamping said first seat between said spring and said housing against movement radially of and away from said axis, said clamping means being of one piece with said housing and said housing further including a bottom wall adjacent said first seat, each of said arms further including a root portion of one piece with said bottom wall and extending substantially tangentially of said first seat.

2. The clutch of claim 1, wherein said first portions of said arms are at least substantially parallel with said axis.

3. The clutch of claim 1, wherein each end portion of said at least one seat is adjacent one of said arms.

4. The clutch of claim 3, wherein both end portions of said at least one seat are adjacent one and the same arm.

5. The clutch of claim 1, wherein said end portions of said at least one seat define a gap extending in the circumferential direction of said at least one seat.

6. The clutch of claim 1, wherein said means for preventing rotation of at least one of said first and second seats relative to the housing forms part of the housing.

7. The clutch of claim 1, wherein said means for preventing rotation includes means for form-lockingly attaching at least one of said first and second seats to said housing.

8. The clutch of 1, wherein said coupling means and said means for preventing rotation are simultaneously formed portions of a converted blank constituting said housing.

9. The clutch of claim 1, wherein said means for preventing rotation comprises deformed portions of at least one of said arms, and the at least one seat has said end portions.

10. The clutch of claim 1, wherein said seat having two end portions is said first seat, and said means for preventing rotation includes a portion of an arm adjacent the end portions of said first seat.

11. The clutch of claim 1, wherein said means for preventing rotation includes a single rotation preventing device including a first portion for preventing rotation of said first seat and a second portion for preventing rotation of said second seat.

12. The clutch of claim 1, wherein said rotation preventing means and said clamping means are simultaneously formed portions of a converted blank constituting said housing.

13. The clutch of claim 1, wherein said clamping means includes an annulus surrounding said first seat and including sections alternating with said arms in the circumferential direction of said seats.

14. The clutch of claim 1, wherein said arms include parts having different thicknesses.

15. The clutch of claim 1, wherein at least one of said first and second seats has a non-circular cross-sectional outline.

16. An engageable and disengageable friction clutch comprising: a housing rotatable about a predetermined axis; a pressure plate coaxial with and connected to said housing with limited freedom of movement in the direction of said axis; a diaphragm spring disposed between said housing and said pressure plate and including a radially outer portion bearing against said pressure plate in the engaged condition of the clutch, a radially inner portion movable axially of said housing to disengage the clutch, and an intermediate portion having a first side confronting said housing and a second side confronting said pressure plate; a composite seat tiltably mounting said intermediate portion and including a first annular seat between said housing and said first side and a second annular seat at said second side of said intermediate portion, each of said first and second seats comprising a wire ring and at least one of said rings having two end portions facing but not connected to each other; means for coupling said seats and said intermediate portion to said housing including a plurality of arms forming part of said housing and having first portions extending substantially in the direction of said axis radially inwardly of said first and second seats and through openings provided in said spring, said arms further having second portions extending from the respective first portions substantially outwardly of said axis and overlying said second seat to thus prevent said seats and said spring from moving relative to said housing substantially radially and in the direction of said axis; means for holding said first seat between said spring and said housing against movement radially of and away from said axis, said holding means being of one piece with said housing and said arms further comprising third portions extending from the respective second portions and being radially outwardly adjacent said second seat to thus prevent movements of said second seat radially outwardly and away from said axis; and means for preventing rotation of at least one of said rings relative to the housing about said axis, said preventing means forming part of said housing and said housing further including a bottom wall adjacent said first seat, each of said arms further including a root portion of one piece with said bottom wall and extending substantially tangentially of said first seat.

17. The clutch of claim 16, wherein said first portions of said arms are at least substantially parallel to said axis.

18. The clutch of claim 16, wherein said arms constitute stamped-out sections of said housing.

19. The clutch of claim 16, wherein said at least one ring is a circular ring and said end portions of said at least one ring are spaced apart from each other.

20. The clutch of claim 16, wherein said means for preventing rotation includes means for form-lockingly attaching at least one of said first and second seats to said housing.

21. The clutch of claim 16, wherein said coupling means and said means for preventing rotation are simultaneously formed portions of a converted blank constituting said housing.

22. The clutch of claim 16, wherein said means for preventing rotation comprises deformed portions of at least one of said arms and the at least one seat having said end portions.

23. The clutch of claim 16, wherein said ring having said end portions is the ring of said first seat and said means for preventing rotation includes a portion of an arm adjacent the end portions of the ring of said first seat.

24. The clutch of claim 16, wherein said means for preventing rotation includes a single rotation preventing device including a first portion for preventing rotation of one of said rings and a second portion for preventing rotation of the other of said rings.

25. The clutch of claim 16, wherein said rotation preventing means and said holding means are simultaneously formed portions of a converted blank constituting said housing.

26. The clutch of claim 16, wherein said holding means includes an annulus surrounding said first seat and including sections alternating with said arms in the circumferential direction of said seats.

27. The clutch of claim 16, wherein said arms include parts having different thicknesses.

28. The clutch of claim 16, wherein at least one of said rings has a non-circular cross-sectional outline.

29. An engageable and disengageable friction clutch comprising: a housing rotatable about a predetermined axis; a pressure plate coaxial and rotatable with said housing and movable relative to said housing in the direction of said axis; a diaphragm spring disposed between said housing and said pressure plate and including a radially outer portion bearing against said pressure plate in the engaged condition of the clutch, a radially inner portion movable axially of said housing to disengage the clutch, and an intermediate portion having a first side confronting said housing and a second side confronting said pressure plate; a composite seat tiltably mounting said intermediate portion and including a first annular seat between said housing and said first side and a second annular seat at said second side of said intermediate portion; means for coupling said seats and said intermediate portion to said housing including a plurality of arms forming part of said housing and having first portions extending substantially in the direction of said axis radially inwardly of said seats through openings provided in said spring, said arms further having second portions extending from the respective first portions substantially radially outwardly of said axis and overlying said second seat to thus prevent said seats and said spring from moving relative to said housing radially inwardly toward and in the direction of said axis, said arms further having third portions extending from the respective second portions and being radially outwardly adjacent said second seat to thus prevent movements of said second seat radially outwardly and away from said axis, said housing including a first portion having a first thickness and second portions alternating with said arms in the circumferential direction of said seats and having a second thickness less than said first thickness; and means for holding said first seat between said housing and said spring against movement radially of and away from said axis, said holding means being of one piece with said housing and comprising a substantially axially extending holding device constituting a part of said housing and surrounding said first seat, said housing further including a bottom wall adjacent said first seat and each of said arms further including a root portion of one piece with said bottom wall and extending substantially tangentially of said first seat.

30. The clutch of claim 29, wherein said arms constitute stamped-out sections of said housing.

31. The clutch of claim 29, wherein at least one of said seats includes a substantially circular wire ring having two end portions adjacent but not connected to each other.

32. The clutch of claim 29, wherein said first portions of said arms are at least substantially parallel to said axis.

33. The clutch of claim 29, wherein at least one of said seats includes a wire ring having two end portions adjacent each other, each of said end portions being adjacent one of said arms.

34. The clutch of claim 33, wherein both end portions of said wire ring are adjacent one and the same arm.

35. The clutch of claim 29, further comprising means for preventing rotation of said seats relative to said housing, including means for form-lockingly attaching at least one of said seats to said housing.

36. The clutch of claim 29, further comprising means for preventing rotation of said seats relative to said housing, said coupling means and said means for preventing rotation being simultaneously formed portions of a converted blank constituting said housing.

37. The clutch of claim 29, further comprising means for preventing rotation of said seats relative to said housing, said means for preventing rotation comprising deformed portions of at least one of said arms and of at least one of said seats.

38. The clutch of claims 29, further comprising means for preventing rotation of said seats relative to said housing including a first portion for preventing rotation of said first seat and a second portion for preventing rotation of said second seat, said first portion of said means for preventing rotation being disposed between two arms of said coupling means.

39. The clutch of claim 29, further comprising means for preventing rotation of said seats relative to said housing, said means for preventing rotation including a single rotation preventing device including a first portion for preventing rotation of said first seat and a second portion for preventing rotation of said second seat.

40. The clutch of claim 29, further comprising means for preventing rotation of said seats relative to said housing, said means for preventing rotation and said holding means being simultaneously formed portions of a converted blank constituting said housing.

41. The clutch of claim 29, wherein said holding means includes an annulus surrounding said first seat and including sections alternating with said arms in the circumferential direction of said seats.

42. The clutch of claim 29, wherein said arms include portions having different thicknesses.

43. The clutch of claim 29, wherein at least one of said seats has a non-circular cross-sectional outline.

* * * * *